(12) United States Patent
Feldman et al.

(10) Patent No.: US 7,840,983 B1
(45) Date of Patent: *Nov. 23, 2010

(54) METHOD AND APPARATUS FOR WIRELESS DIGITAL AUDIO/VIDEO PLAYBACK FOR COMPUTERS

(75) Inventors: Theodore Philip Feldman, San Francisco, CA (US); David Andrew Rice, Syracuse, NY (US)

(73) Assignee: Neosonik, San Francisco, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/744,179

(22) Filed: May 3, 2007

Related U.S. Application Data

(60) Provisional application No. 60/797,417, filed on May 3, 2006.

(51) Int. Cl.
*H04N 7/18* (2006.01)
(52) U.S. Cl. .............................. 725/81; 725/78; 725/80
(58) Field of Classification Search ................... 725/81, 725/78, 80
See application file for complete search history.

(56) References Cited

U.S. PATENT DOCUMENTS

| | | | | |
|---|---|---|---|---|
| 5,822,440 | A * | 10/1998 | Oltman et al. | 381/82 |
| 5,946,343 | A * | 8/1999 | Schotz et al. | 375/141 |
| 6,639,987 | B2 * | 10/2003 | McIntosh | 381/71.6 |
| 6,864,413 | B2 * | 3/2005 | Shiiya | 84/610 |
| 7,034,891 | B2 * | 4/2006 | Joung et al. | 348/565 |
| 7,150,032 | B1 * | 12/2006 | Sadanaka et al. | 725/80 |
| 2001/0021998 | A1 * | 9/2001 | Margulis | 725/81 |
| 2002/0061024 | A1 * | 5/2002 | Malkemes et al. | 370/401 |
| 2003/0108209 | A1 * | 6/2003 | McIntosh | 381/74 |
| 2003/0135860 | A1 * | 7/2003 | Dureau | 725/82 |
| 2003/0172798 | A1 * | 9/2003 | Fujiwara et al. | 84/609 |
| 2004/0215636 | A1 * | 10/2004 | Ogawa et al. | 707/100 |
| 2006/0294569 | A1 * | 12/2006 | Chung | 725/133 |

\* cited by examiner

*Primary Examiner*—Christopher Kelley
*Assistant Examiner*—Mulugeta Mengesha
(74) *Attorney, Agent, or Firm*—Fenwick & West LLP

(57) ABSTRACT

A computer-based digital wireless audio and video system for consumer audio, home theater and recording studio applications is disclosed. The system distributes synchronized 2-channel stereo and multi-channel home theater video and audio digital signals via wireless broadcast to a closed network including a personal computer, a display, and one or multiple digital active loudspeakers or headphones. Each loudspeaker has a separate digital amplifier dedicated to each transducer within it. The system provides a data link capable of sending an all-digital, full-bandwidth signal from the original digital source material to each separate transducer in the system without using sound degrading lossy data compression. This system is designed to read, broadcast, and reproduce with accurate audio and video channel synchronization in the effort to maintain the integrity of the entire audio and video signal.

10 Claims, 4 Drawing Sheets

METHOD AND APPARATUS FOR WIRELESS DIGITAL AUDIO/VIDEO PLAYBACK FOR COMPUTERS

CROSS-REFERENCE TO RELATED APPLICATIONS

This application claims the benefit of U.S. Provisional Application No. 60/797,417 filed on May 3, 2006, hereby incorporated herein by reference.

BACKGROUND

1. Field

This invention relates in general to audio and video playback systems and in particular to a method and a system for playing audio and video from a computer, wireless transferring the source data to a video display or projector and a set of one or more loudspeakers.

2. Related Art

Computers today require connection to conventional audio/video gear in order to play back media source material such as movies and music. Most computer systems offer digital and/or analog output of their audio and video signals, but they still must be hooked up to powered loudspeakers through a line-level cable or either a receiver (with integrated amplification) or external amplifiers which connect to passive analog loudspeakers through the use of speaker wire in order to playback audio, and analog or digital video cables such as DVI and HDMI which are plugged into a video monitor in order to reproduce video. These connections can be extremely cumbersome and cause degradation of the original audio and video signal because they must be converted into an analog format through the use of Digital Audio Converters and then passed down an analog signal path through a series of analog components. With the emergence of computers being used for media playback, these connections have made adopting this type of computer even more prohibitive. Computer manufacturers attempt to introduce Media, or Multimedia style PCs, in order to broaden their market now include control of Home Theaters and Stereo systems. These systems are extremely cluttered, cumbersome and limited in performance potential.

SUMMARY

Since computers process all of their primary signals in the digital domain and most source material has now moved to a digital format, the least cumbersome and highest-performing system topology is to feed these signals through an RF transmitter and beam these digital audio and video signals directly to each loudspeaker and the accompanying video monitor. This eliminates the need to hook up a maze of wires directly to a computer or requiring the computer be hooked up to a series of external amplifiers through a line-level connection. Instead, a series of digital wireless loudspeakers can be placed anywhere in a room and a small video receiver plugged into a TV monitor, and the computer can quickly be configured into a stereo or home theater system without the need for any connecting wires.

Since the original audio and video signals are transmitted in a digital format, the loudspeaker and video monitor can benefit from improved performance by using an all-digital topology by eliminating the need for any extra conversion stages from Analog to Digital, which can seriously degrade system performance. It also means that the loudspeaker can have its amplifier channels integrated into the cabinet, thus allowing active control of all loudspeaker parameters using Digital Signal Processing, which results in far greater control and accuracy of audio signals than in the analog domain. This same elimination of degradation also improves the quality of Video signals as well.

In order to achieve such a system, it is necessary to create synchronization between channels so that the digital audio and video signals are reproduced by each loudspeaker and the video monitor at the same time. The computer can be used as a control center, with actual system controls taking place via a software program that can be accessed through the computer's video screen or remote control. This system can be implemented in both large, desktop-based computers as well as portable, notebook-style computers. It is particularly useful for notebook-style computers, with or without docking station-type connections, since the audio and video cables required to route the signals to the amplifiers and video monitor can be replaced by a wireless connection, thus un-tethering the user from these cumbersome cables and allowing them to move about their living space while still maintaining accurate playback of various media sources.

Therefore, the invention provides a method and apparatus for providing very high quality audio and video playback using all digital paths from a computer to the speaker transducers and video display, including a digital wireless link to connect the computer to the loudspeakers and display. Furthermore, this invention, due to its integrated nature, provides better performance, lower cost and superior ease of installation and use than alternative systems.

The apparatus according to the invention comprises a wireless digital audio and video playback apparatus. One embodiment of the apparatus comprises a computer, which plays back source material from either its disc drive, such as a DVD or CD drive, a connection to an outside network such as an Internet connection or a LAN (Local Area Network) across a wireless or wired input, or from an internal hard disk drive, which produces digital audio and video signals that are used to generate a digitally encoded RF signal; a wireless video receiver which includes an RF receiver for decoding the digital RF signal, and either an output to a standard video monitor or projector, or an integrated video monitor or projector; and one or more wireless speaker units, which include an RF receiver, a digital crossover, one or more class D or digital amplifiers and one or more speaker transducers.

In accordance with one aspect of the invention, the computer transmits the digitally encoded signal to all destinations to be played simultaneously, eliminating the need for a line-level connection to an external amplifier with multiple channels, speaker wires connecting each amplifier channel to each speaker, and conventional passive analog loudspeakers that rely on crossover networks comprised of capacitors, coils and resistors necessary for adjusting the response characteristics of the loudspeaker.

In accordance with another aspect of the invention, the computer transmits the digitally encoded signal to a unit with an RF receiver and amplifier at all destinations that outputs an analog signal to a conventional analog loudspeaker or display.

In accordance with another aspect of the invention, each loudspeaker uses a separate digital amplifier for each transducer and a digital crossover performed through the use of digital signal processing to adjust the frequency response, phase and time-alignment of each transducer to provide the optimal response in the audio frequency range. The adjustment parameters can be stored in either the speaker, or the computer, allowing each speaker to have an individually optimized audio response.

DETAILED DESCRIPTION

Figure 1:
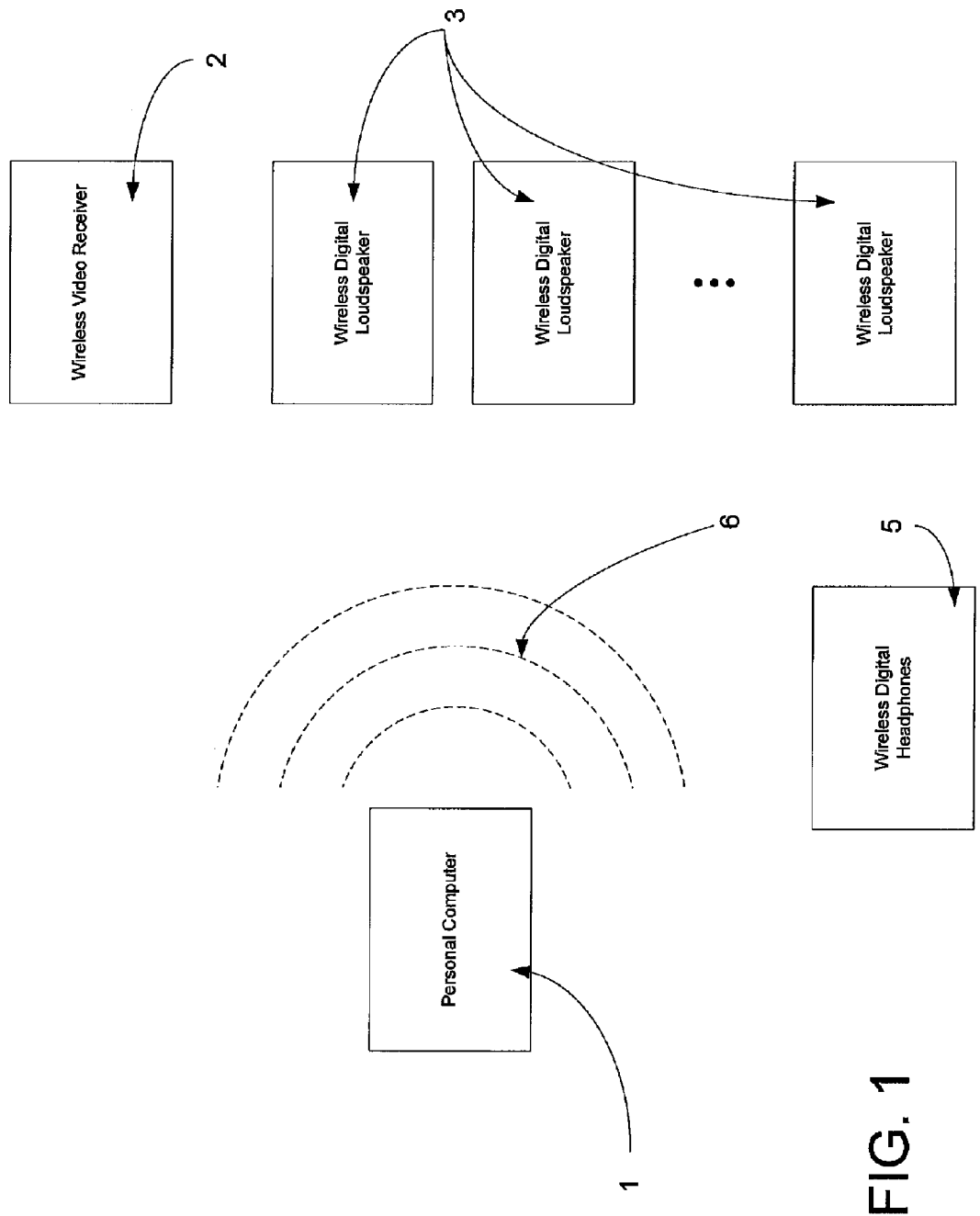
FIG. 1 is a diagram illustrating a computer-based digital wireless playback apparatus, according to an embodiment of the invention.

With reference now to the Drawings, and in particular to FIG. 1, there is depicted a representation of the digital wireless playback apparatus. The apparatus comprises primary elements: a personal computer 1, a wireless video receiver 2, one or more wireless digital loudspeakers 3, and optionally one or more wireless digital headphones. The personal computer 1 includes a radio transmitter or transceiver, either integrated onto the computer's main board, on an adapter card, or in an external box. The personal computer 1 communicates the source data to the video receiver 2, the digital loudspeakers 3, or digital headphones 5 via a wireless transmission 6.

Figure 2:
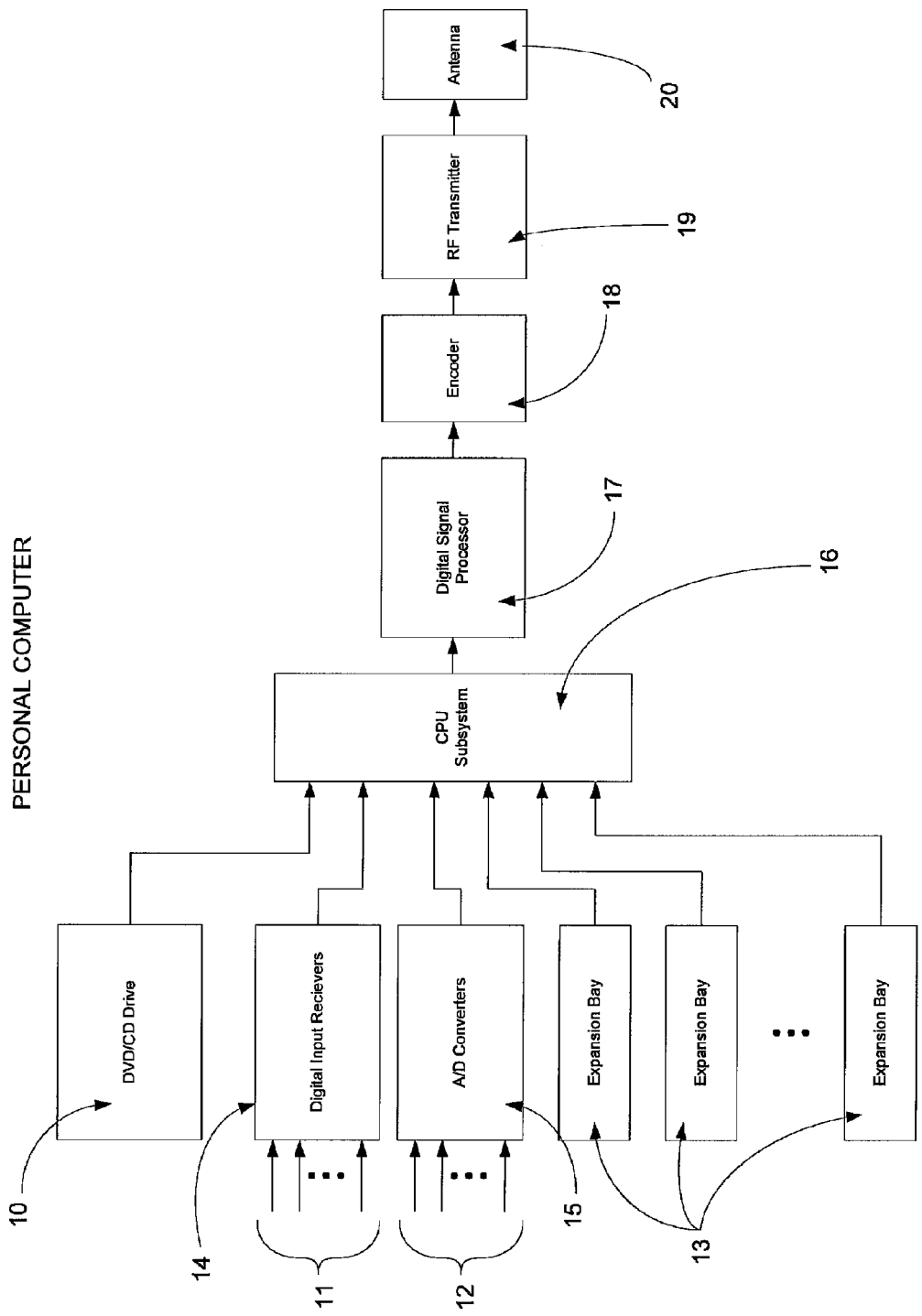
FIG. 2 is a diagram illustrating a computer, according to an embodiment of the invention.

Referring now to FIG. 2, the personal computer 1 includes a DVD drive or like distribution media replay mechanism 10, one or more digital inputs 11 and analog inputs 12, and one or more internal modular expansion slots for adding additional source capabilities such as an AM/FM radio, an Ethernet Port, or other digital sources 13. The personal computer 1 can optionally accept and process digital music formats like CD, DVD, MP3 and Internet streaming, along with high-resolution formats like SACD and DVD-A. Optionally, it can also accept surround sound formats such as from Dolby and DTS.

The digital audio inputs 11 enable additional digital sources such as Digital TV and DAT (digital audio tape) to be played by the computer 1 without extra D/A (digital to analog) conversion. These inputs are routed through the personal computer's digital audio receivers 14. The analog audio inputs 12 accept analog sources such as record players, VCRs and/or tape decks and are routed through the personal computer's internal A/D converter 15. Digital and analog video inputs enable a variety of video sources to be switched by the personal computer and broadcast to a video monitor within range that is equipped with a wireless video receiver 2.

The central processing unit (CPU) subsystem 16 controls which of the inputs are provided to the digital signal processor (DSP) 17. This function can be performed by the personal computer's CPU or by other peripheral circuitry.

The personal computer 1 takes the digital source material and controls a variety of audio functions such as volume control, equalization (digital bass & treble, etc. controls as well as optional room correction) and/or surround sound processing in the digital domain via a DSP 17. The DSP 17 determines if the signal is stereo or surround sound, performs the desired audio processing, and prepares the data for transmission. A digital encoder 18 creates a digital bitstream or several digital bitstreams which contain the data of all of the music and video channels of the processed source material. The encoder 18 sends the encoded bitstream or bitstreams to the RF transmitter 19, which modulates the data onto an RF signal. The RF signal is then transmitted through antenna 20. This multi-channel wireless broadcast distributes digital audio and video data to a closed network of loudspeakers, headphones and video monitors. Preferably, and in order to broadcast all popular audio and video formats in full-bandwidth without compression, the wireless system's bandwidth capability exceeds 35 Mbps. Alternatively, lossless compression algorithms could be used to reduce this bandwidth without degradation, or lossy compression could be used if the degradation of the audio and/or video quality can be tolerated.

The personal computer 1 can broadcast signals within the constraints of FCC rules, thus giving it the ability to transmit to speakers and video monitors throughout a user's home or facility. The wireless bandwidth may be divided into separate broadcast channels, meaning the personal computer may broadcast different sources to different loudspeakers, or headphones, throughout the user's home or facility. The primary limitation on the number and variety of sources broadcast is the overall system bandwidth.

Various other parameters of the system may be controlled through software in personal computer 1. Such controls may include volume controls, tone controls, processing controls, and DVD/CD controls.

Figure 3:
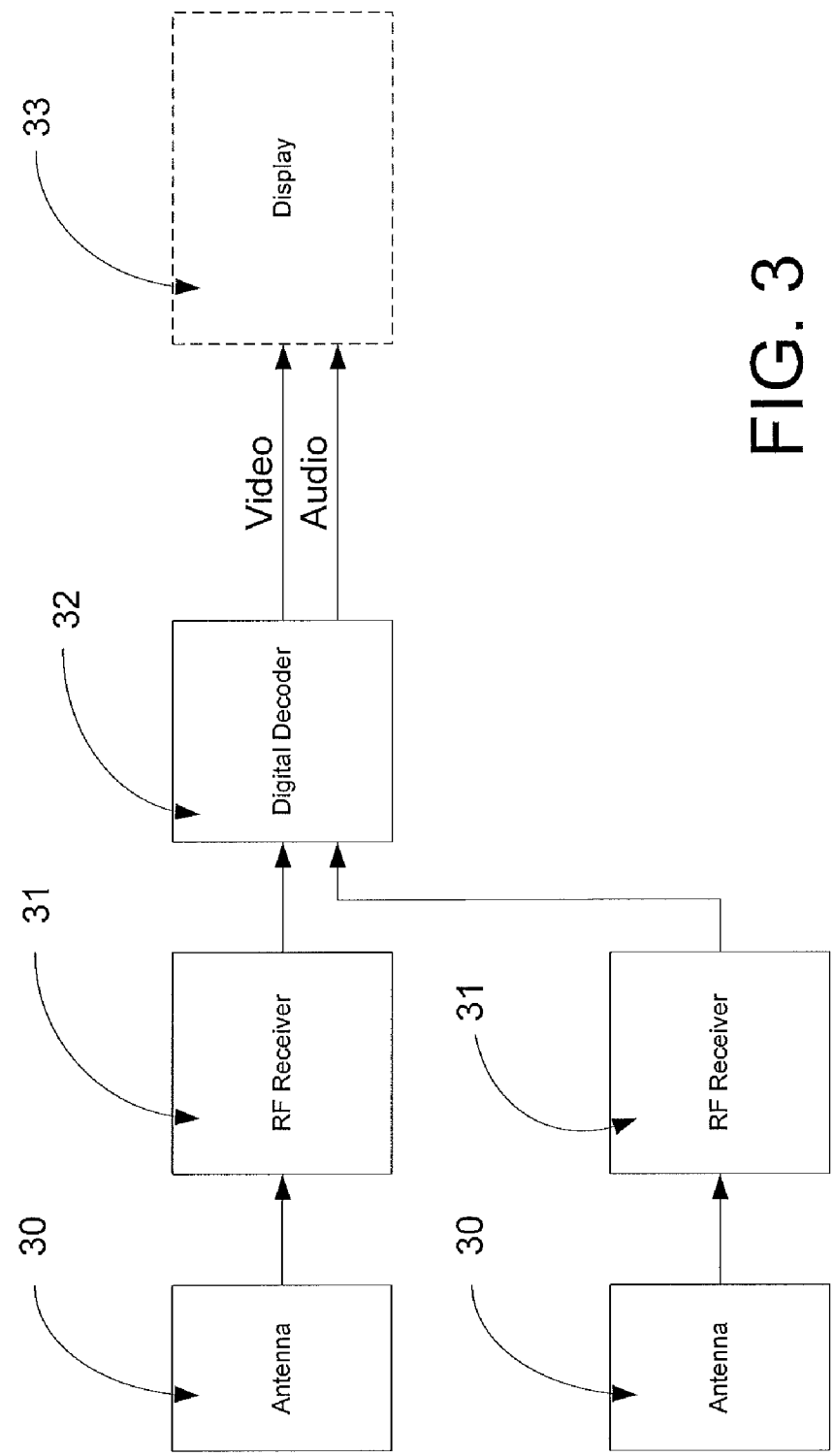
FIG. 3 is a diagram illustrating the internal details of the high-bandwidth wireless video receiver, according to an embodiment of the invention.

Referring now to FIG. 3, the internal details of the high-bandwidth wireless video receiver 2 are designed to capture the video broadcast from the personal computer 1. This receiver can be built into any kind of TV receiver or monitor, such as Plasma and other flat-screen monitors as well as DLP, LCD and CRT Projectors, or it can be a separate unit that connects to a standard commercially available display or projector. Preferably, this receiver receives at least 30 Mbps of data in order to receive video signals at full-bandwidth, such as NTSC, DVD, and HDTV. Alternatively, lossless compression algorithms could be used to reduce this bandwidth without degradation, or lossy compression could be used if the degradation of the audio and/or video quality can be tolerated. The video receiver 2 comprises one or more antennas 30, one or more RF receivers 31, a decoder 32, and an optional display 33. If the display is not included in the video receiver, then an output such as a digital video input (DVI) format output signal or an analog video signal is provided to drive external displays or projectors.

The antennas 30 receive the encoded RF signal and pass the signal to the RF receivers 31. An RF receiver 31 demodulates the RF signal to produce a digital bitstream which is a reproduction of the transmitted bitstream in the personal computer 1. In many cases a single receiver is sufficient, but for better immunity to multipath, spatial diversity can be used, comprising multiple antennas 30 and receivers 31. The bitstream output by the receivers 31 are passed to the decoder 32 which select the best stream at any point in time and decodes the bitstream into a digital video bitstream. The decoder 32 may strip off the audio channels and discard them, or it may provide audio data streams for integrated speakers in the video monitor or projector.

Figure 4:
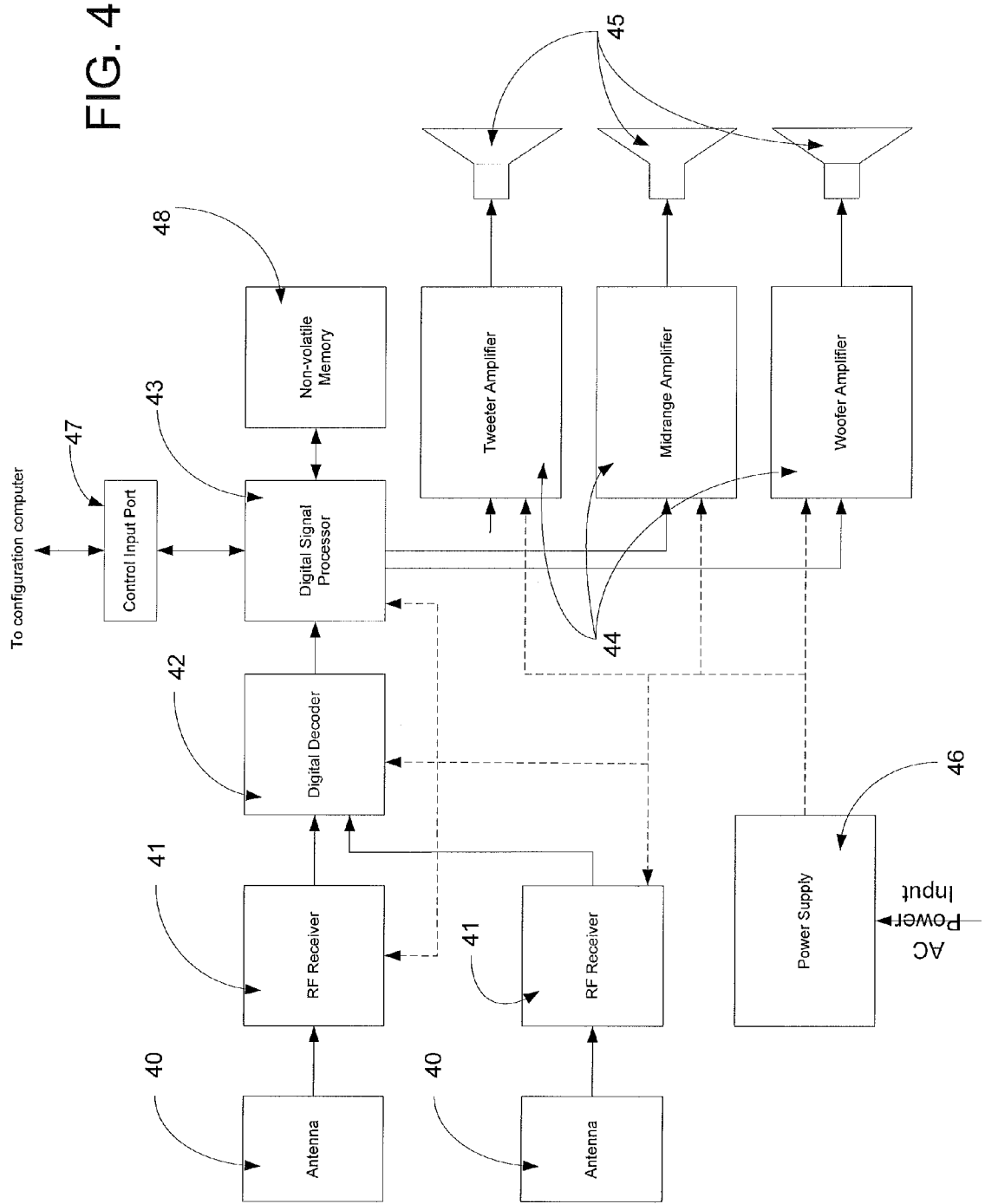
FIG. 4 is a diagram illustrating the internal details of the wireless digital loudspeaker, according to an embodiment of the invention.

Referring now to FIG. 4, the internal details of an embodiment of the wireless digital loudspeaker 3 are depicted.

The digital loudspeaker 3 comprises one or more antennas 40, one or more RF receivers 41, a digital decoder 42, a digital signal processor 43, one or more amplifiers 44, one or more speaker transducers 45, and one or more power supplies 46.

As in the wireless video receiver 2, the wireless loudspeakers 3 can use spatial diversity for providing continuous service in the presence of multipath. To this end, the loudspeaker 3 may include more than one antenna 40 and receiver 41. The output of each receiver is a bitstream that mirrors the bitstream encoded in the personal computer 1. The bitstreams from each receiver are passed to the digital decoder 42, which decodes the bitstream into its separate audio components. The audio data is then sent into the DSP 43 for further processing. The decoder may preferably be implemented in an FPGA or ASIC.

The DSP 43 selects which portion of the audio data will be processed. In a stereo signal, a speaker will process either the left or right channel. In a surround sound signal, a speaker will select from among the multiple channels. The selection of what signal is used can be controlled through either some form of user or factory settable switch or jumper, or through a software configuration stored in non-volatile memory 48. The DSP 43 filters the signal to correct the frequency response of the speaker. It then breaks the equalized signal into signals tailored for individual transducers. This is done by performing crossover, phase matching, and time alignment filtering function in a digital implementation. The filtering options available to a DSP processor are far more numerous and more controllable than those available through analog filtering techniques. In one embodiment, the crossover filtering is done using finite impulse response filters. Crossover filtering could also be done using infinite impulse response (IIR) filters. These techniques are well known to those skilled in the art.

The output of the DSP 43 is a set of digital signals, one for each speaker transducer. These signals are directed to the inputs of digital amplifiers 44. These amplifiers 44 are designed to take digital audio input and generate a high power output signal that drives the transducer to produce an accurate reproduction of the original source material. One embodiment uses a class D audio amplifier, which may comprise one or more integrated and discrete circuits per transducer, or one or more transducers may be driven by a single integrated circuit. Other types of amplifiers could be used for this function. By eliminating the passive crossover and dedicating a separate digital amplifier to each transducer, a full-bandwidth discrete path is created all the way back to the digital source material.

The functions of DSP 43 could, in an alternate embodiment, be integrated into the digital amplifiers 44. The digital amplifiers 44 could be a single integrated circuit per channel, or could be a multi-channel amplifier, with or without DSP functions integrated.

A series of loudspeakers designed for specific applications such as Main Channels, Center Channels, Surround Channels and Subwoofers can be used to capture the wireless digital audio data and convert it into sound pressure. In one embodiment, a loudspeaker cabinet comprises an amplifier plate mounted on the back. This amp plate holds the speaker's electronics. The plate includes a detachable power cord and a proprietary control input port 47. This control port 47 is used during final assembly to program the DSP 43 of a loudspeaker. During this final test procedure, a loudspeaker's characteristics could be measured and then corrected to match the desired final design standard. These corrections are sent into the speaker and stored in a non-volatile memory 48 by the speaker's DSP, via the control input port 47. A speaker that leaves the production line can be DSP-corrected to match the production standard.

Antennas 40 placed within or externally to the loudspeaker enclosure capture the full-bandwidth digital audio broadcast from the personal computer 1. Digital wireless headphones capable of receiving the full-bandwidth signal from the personal computer can also be added to the system.

The wireless digital headphones 5 are a subset of the wireless digital loudspeaker 3, where there are only two amplifiers and transducers, one for each side of the headset. Crossovers are not required in this application, since only a single transducer is used per channel.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A digital wireless audio and video playback system for a computer, comprising:
 a computer comprising:
  a video signal input for receiving a digital video signal;
  an audio signal input for receiving a plurality of digital audio signals, each digital audio signal associated with an audio channel;
  a digital signal processor coupled to receive the audio signals and process the audio input signals in the digital domain;
  an encoder coupled to the digital signal processor and the video signal input to receive the digital video signal and to encode the digital video signal into digital video bitstream and further coupled to the digital signal processor to receive the audio signals, and to encode each audio signal into uncompressed digital audio bitstream;
  an RF transmitter coupled to the encoder to receive the digital video bitstream and the plurality of digital audio bitstreams, modulate each digital bitstream into an assigned channel on a radio frequency (RF) digital broadcast signal and to transmit the digital broadcast signal to a plurality of receivers, to provide a point-to-multipoint transmission of the video signal and audio signals;
  a software module to control at least one parameter of the digital wireless audio and video playback system;
 a wireless video receiver assigned to one of the channels of the digital broadcast signal, and comprising:
  a first RF receiver to receive the digital broadcast signal for the digital video bitstream, and demodulate the broadcast signal to obtain the encoded digital video bitstream;
  a video decoder coupled to the RF receiver to receive the encoded digital video bitstream, and to decode and output the digital video signal to a display device; and
 a plurality of wireless audio receivers, each audio receiver assigned to one of the channels of the digital broadcast signal, and comprising:
  a second RF receiver to receive the digital audio broadcast signal and to demodulate the signal to obtain the encoded, uncompressed digital audio signal;
  an audio decoder coupled to the RF receiver to receive the encoded digital audio signal to decode the digital audio signal;
  a digital signal processor coupled to the decoder to process the digital audio signal in the digital domain; and
  at least one amplifier coupled to receiver and to amplify the audio signal, and
 provide an amplified analog audio signal to a loudspeaker.

2. The digital wireless audio and video playback system for a computer of claim 1, wherein each wireless audio receiver further comprises:
 a housing;

the wireless audio receiver contained inside the housing; and one or more loudspeakers coupled to the housing, and to the amplifier to output the audio signal.

3. The digital wireless audio and video playback system for a computer of claim 1, wherein the amplifier is a class D amplifier.

4. The digital wireless audio and video playback system for a computer of claim 1, wherein the digital broadcast signal is not compressed.

5. The digital wireless audio and video playback system for a computer of claim 1, wherein the plurality of wireless audio receivers comprises:

a left channel receiver for receiving a digital audio signal assigned to a left audio channel;

a right channel receiver for receiving a digital audio signal assigned to a right audio channel; and a center channel receiver for receiving a digital audio signal assigned to a center audio channel.

6. The digital wireless audio and video playback system for a computer of claim 1, wherein the plurality of wireless audio receivers comprises:

a plurality of surround speakers, each surround speaker assigned to one of the audio channels.

7. The digital wireless audio and video playback system for a computer of claim 1, wherein the at least one amplifier of a wireless audio receiver includes a tweeter amplifier, and at least one of a midrange amplifier and woofer amplifier.

8. The digital wireless audio and video playback system for a computer of claim 1, wherein the video receiver further comprises:

a video display for receiving the video signal and displaying an image; and at least two speakers coupled to the at least one amplifier for outputting the audio signals from at least two of the audio channels.

9. The digital wireless audio and video playback system for a computer of claim 1, wherein the controller further comprises:

a central processing unit to select from among the input signals from the one or more digital signals to provide to the digital signal processor.

10. A digital wireless audio and video playback system for a computer, comprising:

a computer comprising:

a video signal input for receiving a digital video signal;

an audio signal input for receiving a plurality of digital audio signals, each digital audio signal associated with an audio channel;

a digital signal processor coupled to receive the audio signals and process the audio input signals in the digital domain; and an encoder coupled to the digital signal processor and the video signal input to receive the digital video signal and to encode the digital video signal into digital video bitstream and further coupled to the digital signal processor to receive the audio signals, and to encode each audio signal into uncompressed digital audio bitstream;

an RF transmitter coupled to the encoder to receive the digital video bitstream and the plurality of digital audio bitstreams, modulate each digital bitstream into an assigned channel on a radio frequency (RF) digital broadcast signal and to transmit the digital broadcast signal to a plurality of receivers, to provide a point-to-multipoint transmission of the video signal and audio signals;

a software module to control at least one parameter of the digital wireless audio and video playback system;

a wireless audio-video receiver, comprising:

a RF receiver to receive the digital broadcast signal, and demodulate the broadcast signal to obtain the encoded digital video bitstream and digital audio bitstreams from respective channels of the digital broadcast signal;

a video decoder coupled to the RF receiver to receive the encoded digital video bitstream, and to decode and output the digital video signal to a display device;

an audio decoder coupled to the RF receiver to receive the encoded digital audio signals to decode the digital audio signals into respective audio channels;

a digital signal processor coupled to the audio decoder to process the digital audio signal in the digital domain; and at least one amplifier coupled to receiver and to amplify the audio signals, and provide an amplified analog audio signals to respective loudspeakers.

\* \* \* \* \*